United States Patent
Mills et al.

(10) Patent No.: US 6,972,675 B2
(45) Date of Patent: Dec. 6, 2005

(54) VEHICLE TURN SIGNAL SYSTEM

(75) Inventors: Aaron L. Mills, Ann Arbor, MI (US); Gerald H. Engelman, Plymouth, MI (US); Liwen Xu, Southfield, MI (US); Samir Mohamad Beydoun, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 10/762,705

(22) Filed: Jan. 22, 2004

(65) Prior Publication Data

US 2005/0162266 A1  Jul. 28, 2005

(51) Int. Cl.[7] .......................... B60Q 1/40; B60Q 1/34; B60Q 1/22; B60Q 1/26
(52) U.S. Cl. .................. 340/476; 340/463; 340/465; 340/468; 340/475; 340/477
(58) Field of Search .................... 340/476, 463–465, 340/468, 475

(56) References Cited

U.S. PATENT DOCUMENTS

| | | | |
|---|---|---|---|
| 6,483,430 B2 * | 11/2002 | Okuda et al. ............... | 340/476 |
| 6,757,611 B1 * | 6/2004 | Rao et al. .................... | 701/301 |
| 2004/0233051 A1 * | 11/2004 | Madau ........................ | 340/476 |

* cited by examiner

*Primary Examiner*—Jeffery Hofsass
*Assistant Examiner*—Lam Pham
(74) *Attorney, Agent, or Firm*—Frank A. MacKenzie

(57) ABSTRACT

A turn signal system includes at least one sensor detecting road markers and generating therefrom road marker signals. A turn signal deactivates in response to a control command generated by a controller. The controller receives the road marker signals, and determines at least one of whether the system is undergoing a turning condition or has completed the turning condition from the road marker signals. The controller generates the control command when the system has completed the turning condition. A redundancy system verifies the control command.

18 Claims, 2 Drawing Sheets

VEHICLE TURN SIGNAL SYSTEM

TECHNICAL FIELD

The present invention relates generally to turn signal control and more particularly to a system and method for switching on and off a turn signal.

BACKGROUND OF THE INVENTION

Current turn signal lever systems include two drawbacks. Firstly, for certain steering wheel positions, the turn signal lever cannot be latched to the "on" position after a driver switches it on. The turn signal is typically steering wheel position dependant such that it is released back to an "off" position after a turn is complete.

Secondly, automatic returning of the signal lever to the off position after a driver finishes a lane change, is currently unreliable when the driver fails to manually return the signal lever to the off position.

The limitations associated with current turn signal switching techniques have made it apparent that a new technique to turn off turn signals is needed. The new technique should substantially reduce required driver control over the turn signal and should include a redundancy check to verify proper turn signal switching operations are engaged. The present invention is directed to these ends.

SUMMARY OF THE INVENTION

The present invention provides a vehicle turn signal system controlling a turn signal switch. In accordance with one embodiment of the present invention, a turn signal system includes at least one sensor detecting road markers and generating therefrom road marker signals. A turn signal deactivates in response to a control command generated by a controller. The controller receives the road marker signals and determines at least one of whether the system is undergoing a turning condition or has completed the turning condition from the road marker signals. The controller generates the control command when the system has completed the turning condition. A redundancy system verifies the control command.

In accordance with another embodiment of the turn signal system, a control method for a vehicle having a turn signal includes receiving road marker data and analyzing the road marker data as a function of predetermined road conditions. A control command is generated to turn off the turn signal in response to the predetermined road conditions indicating one of a turn is completed or a lane change is completed. Occurrence of the at least one of the turn is completed or the lane change is completed is verified during a redundancy check; and the turn signal is switched off.

Other advantages of the invention will become apparent to one of skill in the art viewing the following detailed description, which includes reference to the drawings, illustrating features of the invention by way of example.

BRIEF DESCRIPTION OF THE DRAWINGS

For a more complete understanding of the present invention, reference should now be made to the embodiments illustrated in detail in the accompanying drawings and described below by way of examples of the invention.

In the drawings.

DETAILED DESCRIPTION OF THE INVENTION

Figure 1:
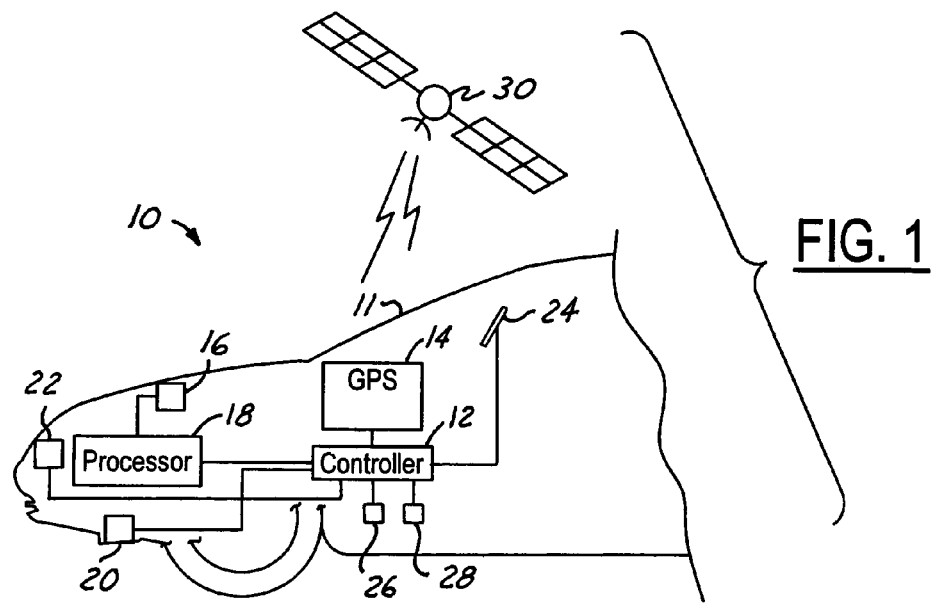
FIG. 1 is a vehicle turn signal system in accordance with one embodiment of the present invention.

Referring now to the drawings, wherein like reference numerals are used to identify identical components in the various views, FIG. 1 illustrates a vehicle turn signal system 10 for controlling a vehicle turn signal 22 and turn signal switch 24.

The vehicle turn signal system 10 includes a turn signal controller 12 receiving signals from a GPS processor 14, a digital camera 16 and processor 18 therefor, and a vehicle speed sensor 20 or accelerometer. The turn signal controller 12 generates signals that are received by a turn signal 22 and a turn signal switch 24. The digital camera 16 and image processor 18, i.e. the vision system, receive images of road markers, including: road landscapes, lane marks, signs, and traffic lights, while the vehicle 11 is either stopped or moving. The vision system also receives signals while the vehicle 11 is changing lanes or turning.

The GPS receiver 14 receives global positioning signals from a satellite 30, which is tracking the vehicle 12, to check whether or not the vehicle 12 has completed a turning condition, such as: lane changing or turning. The GPS unit 14 is included, in one embodiment of the present invention, as a redundant measure for the vision system.

The turn signal controller 12 receives signals from the GPS unit 14 and the image processor 18 and turns the turn signals on and off as a function of the driver turn input, inputs from the GPS unit 14, and signals from the vision system processor 18. Additionally, the turn signal controller 12 uses vehicle speed (measured in, e.g., the speed sensor 20) to distinguish lane switching from right or left turn operations.

Examples of controller 12 operations include automatically turning off the turn signal switch 24 and signal 22 when the vehicle 12 finishes lane switching on highways or city streets; automatically turning off the turn signal switch 24 and signal 22 when the vehicle 12 finishes a turn at a traffic light or stop sign; automatically turning off the turn signal switch 24 and turn signal 22 when a driver turns them on and then does not make the turn or lane switching operation but forgets to turn them off for a threshold period of time.

A turn signal controller 12, in another embodiment of the present invention, may work in tandem with a blind spot sensing system to give a warning when a driver switches the turn signal switch 24 on while a blind spot vehicle prohibits lane changing. An example of a blind spot sensing system is a system operating as a subfunction of the vision system processor 18.

Figure 2A:
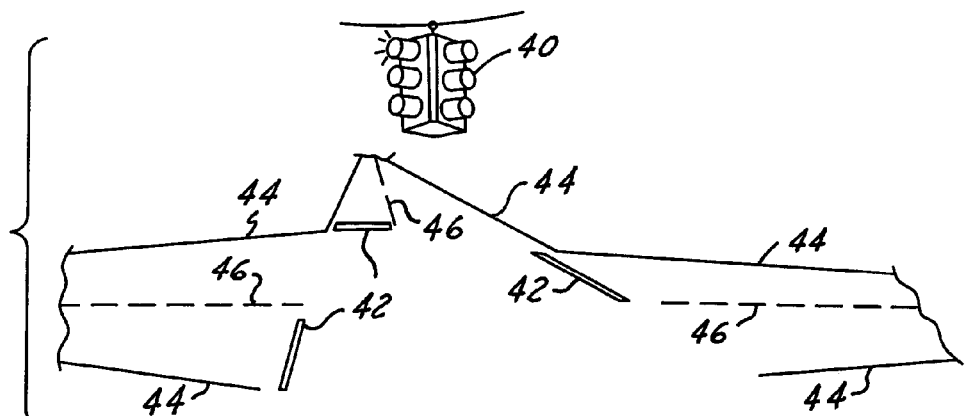
FIG. 2A is a video image viewed from the vehicle when the vehicle is stopped and waiting for a right turn at a road crossing in accordance with another embodiment of the present invention.

Referring to FIG. 2A, a video image viewed from the vehicle 12 by the camera 16 when the vehicle 12 is stopped and waiting for a right turn at a road crossing. Illustrated are common markers that the processor 18 will receive from the camera 16. These markers include stop lights 40, crosswalks or white lines on the road 42, road edge lines 44, road dotted lines 46, and various other markers such as stop signs, fences, etc. (which are not herein illustrated).

Figure 2B:
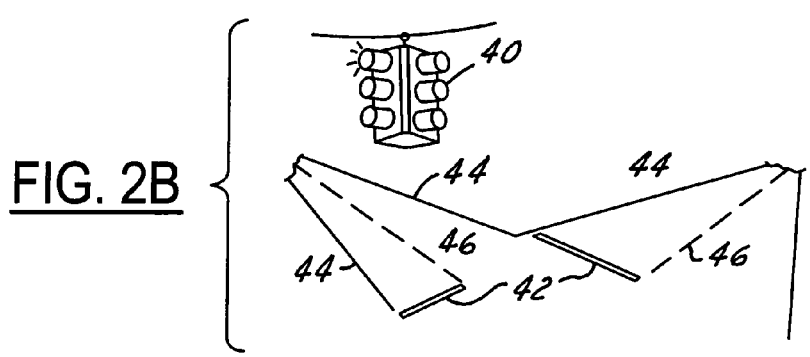
FIG. 2B is a video image while the vehicle is in the middle of a turn in accordance with another embodiment of the present invention.

FIG. 2B illustrates an image received in the camera 16 and processed by the image processor 18 while the vehicle 12 is in the middle of a turn. FIG. 2B illustrates a different pattern of the objects 40, 42, 44, and 46 received in the camera 16. The processor 18 receives these signals and determines therefrom that the vehicle 12 is in the middle of a turn.

Figure 2C:
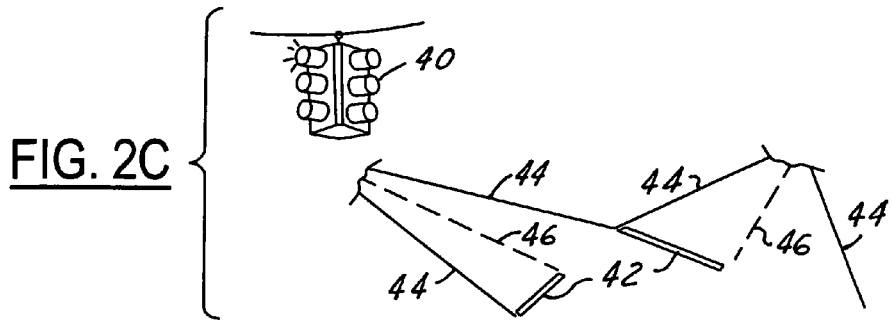
FIG. 2C is a video image while the vehicle is in the middle of a turn in accordance with another embodiment of the present invention.

FIG. 2C illustrates the image received in the camera 16 when the vehicle 12 has almost completed the turn. The camera 16 receives the marker signals, and the processor 18 processes them to determine that the vehicle 12 has almost finished the turn.

Figure 2D:
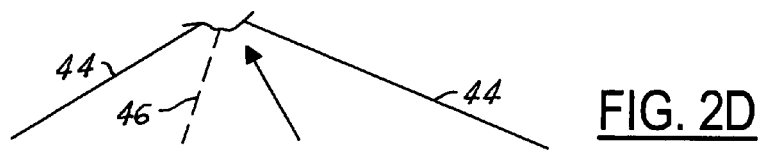
FIG. 2D is a video image when the vehicle completes the turn in accordance with another embodiment of the present invention.

FIG. 2D illustrates images received by the camera 16 when the vehicle 12 has completed the turn. The road markers 44 and 46 are processed by the processor 18 to determine that the vehicle 12, has, in fact, completed the turn. Various other combinations of markers and turn situations are also included as alternate embodiments to the present invention.

Figure 3:
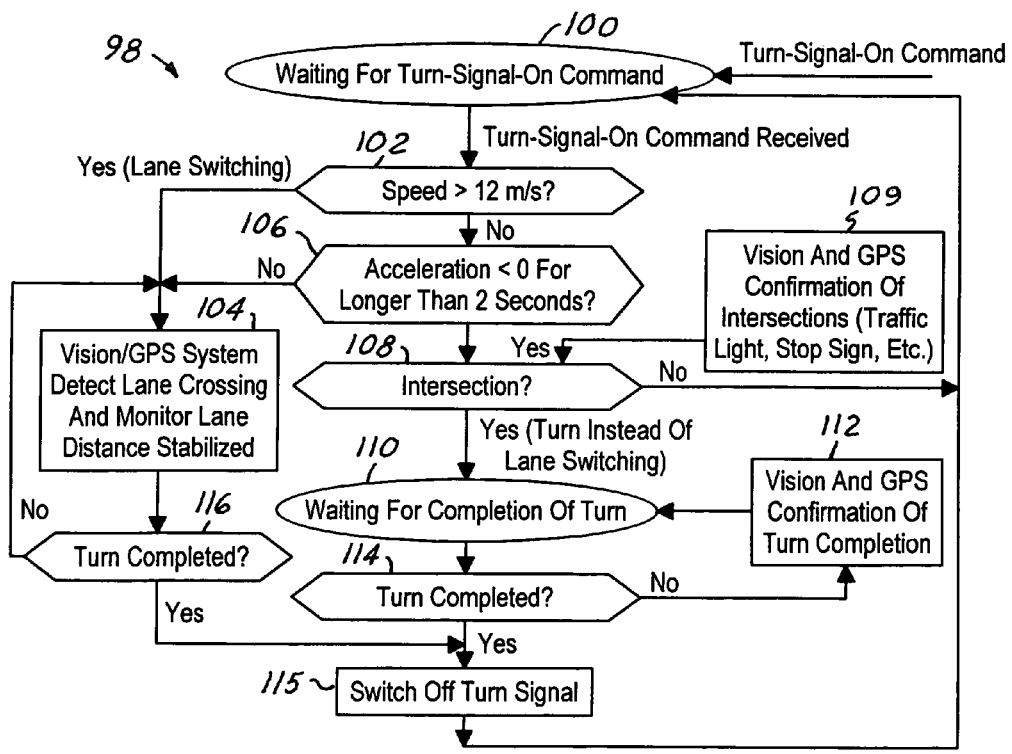
FIG. 3 is a logic flow diagram of a method for controlling a vehicle turn signal switch in accordance with another embodiment of the present invention.

Referring to FIG. 3, a logic flow diagram of a vehicle turn signal system in accordance with another embodiment of the present invention, is illustrated. Logic starts in operation block 100 when a turn signal on command is received in the system. A check is then made in inquiry block 102 whether the speed of the vehicle is greater than a threshold speed, for example, 12 meters per second.

For a positive response, lane switching is occurring and, in operation block 104 vision and GPS systems detect lane crossings and monitor lane distance stabilization. Otherwise in inquiry block 106, a check is made whether the acceleration is less than zero for longer than two seconds. For a negative response, operation block 104 activates.

Otherwise, in inquiry block 108, a check is made whether the vehicle is at an intersection. For a negative response, operation block 100 reactivates.

Otherwise, in operation block 109, vision and GPS information is received; and a confirmation of predetermined conditions including: intersections, mid-turn, turn completed, lane changing, or stopped vehicle is made. Road markers for these predetermined conditions include street lines, traffic lights, fences, stop signs, etc.

Operation block 110 also activates as a function of a positive response to inquiry block 108. In operation block 110, the vehicle is turning instead of switching lanes, and the system waits for completion of the turn while receiving vision and GPS confirmation of turn completion information from operation block 112.

In inquiry block 114 a check is made whether the turn is completed. For a positive response, the turn signal is switched off. Otherwise operation block 112 continues to send vision and GPS information to operation block 110.

Vision and GPS system lane detecting and monitorization and lane distance stabilization from operation block 104 are also received in inquiry block 116 where a check is made whether the turn is completed. For a negative response, operation block 104 continues to send information to inquiry block 116 until a positive response is generated. For a positive response, operation block 115 activates and the turn signal is switched off. And logic returns to operation block 100 to wait for a turn signal on command.

In operation, a control method for a vehicle having a turn signal includes activating the turn signal; receiving road marker data; and analyzing the road marker data as a function of predetermined road conditions, thereby determining whether the road marker data indicates that the vehicle is stopped, is turning, has completed a turn, is changing lanes, or has completed a lane change. A control command is generated to turn off the turn signal in response to the predetermined road conditions indicating one of a turn is completed or a lane change is completed. Occurrence of the at least one of the turn is completed or the lane change is completed is verified through a GPS system as a redundancy check. A verified turn completed signal is generated as a function of a determination that the vehicle has completed the turn or generating a verified lane change signal as a function of a determination that the vehicle has completed the lane change. The turn signal is switched off in response to at least one of: the verified turn completed signal, the turn is completed, the a lane change is completed, or a signal indicating the turn signal has been activated for a threshold length of time wherein no turning or lane changing operation has occurred.

The above-described apparatus and method, to one skilled in the art, is capable of being adapted for those purposes and is not limited to automotive systems. The above-described invention may also be varied without deviating from the spirit and scope of the invention as contemplated by the following claims.

What is claimed is:

1. A turn signal system for a vehicle comprising:
at least one sensor detecting road markers and generating therefrom road marker signals;
a turn signal deactivating in response to a control command;
a controller receiving said road marker signals, said controller determining at least one of whether the system is undergoing a turning condition or has completed said turning condition from said road marker signals, said controller generating said control command when the system has completed said turning condition; and
a redundancy system verifying said control command; wherein said redundancy system comprises a GPS system comprising a GPS receiver receiving signals from a staellite indicating a position of the system relative to said road markers.

2. The system of claim 1 further comprising an array of sensors detecting a position and a velocity of the system.

3. The system of claim 1, wherein said turning condition comprises a turn or a lane change.

4. The system of claim 1, wherein said controller further generates a determination as to whether the system is at rest and at a traffic light, a stop sign, or other traffic regulating medium, said controller generating a turn signal wait signal as a function of said determination.

5. The system of claim 1, wherein said turn signal is activated in response to a driver input or an activation signal from said controller.

6. The system of claim 1, wherein said road marker signals comprise road landscapes, lane marks, signs, fences, and traffic lights.

7. The system of claim 1, wherein said redundancy system further comprises a secondary vision system, or an accelerometer system.

8. The system of claim 1, wherein said at least one sensor comprises a vision system, a radar sensor, or a lidar sensor.

9. The system of claim 1, wherein said at least one sensor comprises a vision system comprising a camera and a vision system processor, wherein one of said processor or said controller process image signal data and classify said road markers, thereby generating said road marker signals.

10. A control method for a vehicle having a turn signal comprising:
- receiving road marker data;
- analyzing said road marker data as a function of predetermined road conditions;
- generating a control command to turn off the turn signal in response to said predetermined road conditions indicating one of a turn is completed or a lane change is completed;
- verifying occurrence of said at least one of said turn is completed or said lane change is completed as a redundancy check;
- wherein verifying comprises receiving satellite tracking information for the vehicle and generating a verified turn completed signal as a function of a determination that the vehicle has completed said turn or generating a verified lane change signal as a function of a determination that the vehicle has completed said lane change; and
- switching off the turn signal.

11. The method of claim 10, wherein analyzing further comprises analyzing whether said road marker data indicates that the vehicle is stopped, is turning, has completed a turn, is changing lanes, or has completed a lane change.

12. The method of claim 10, wherein verifying further comprises determining whether the vehicle is in motion or stopped for longer than a threshold amount of time.

13. The method of claim 10, wherein generating further comprises checking whether the vehicle is traveling above a threshold speed for the vehicle making a lane change and below said threshold speed for the vehicle turning at an intersection.

14. The method of claim 10, further comprising generating a warning signal when the turn signal is activated while a blind spot vehicle prohibits lane changing.

15. The method of claim 10, wherein switching of the turn signal further comprises switching off the turn signal when the turn signal has been activated for a threshold length of time wherein no turning or lane changing operation has occurred.

16. A control method for a vehicle having a turn signal comprising:
- activating the turn signal;
- receiving road marker data;
- analyzing said road marker data as a function of predetermined road conditions, thereby determining whether said road marker data indicates that the vehicle is stopped, is turning, has completed a turn, is changing lanes, or has completed a lane change;
- generating a control command to turn off the turn signal in response to said predetermined road conditions indicating one of a turn is completed or a lane change is completed;
- verifying occurrence of said at least one of said turn is completed or said lane change is completed through a GPS system as a redundancy check;
- generating a verified turn completed signal as a function of a determination that the vehicle has completed said turn or generating a verified lane change signal as a function of a determination that the vehicle has completed said lane change; and
- switching off the turn signal in response to at least one of: said verified turn completed signal, said turn is completed, said a lane change is completed, or a signal indicating the turn signal has been activated for a threshold length of time wherein no turning or lane changing operation has occurred.

17. The method of claim 16 further comprising generating a warning signal when the turn signal is activated while a blind spot vehicle prohibits lane changing.

18. The method of claim 16, wherein verifying further comprises determining whether the vehicle is in motion or stopped for longer than a threshold amount of time.

* * * * *